US011020708B2

(12) United States Patent
 Roitel et al.

(10) Patent No.: US 11,020,708 B2
(45) Date of Patent: Jun. 1, 2021

(54) CONNECTING MECHANISM FOR A WATER PURIFICATION CARTRIDGE

(71) Applicant: Merck Patent GmbH, Darmstadt (DE)

(72) Inventors: Pascal Roitel, Strasbourg (FR); Germain Gaydier, Carrieres sous Poissy (FR); Thierry Cassou, Montigny le Bretonneux (FR); Christian Berducat, Saint-Mande (FR)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 15/548,423

(22) PCT Filed: Jan. 21, 2016

(86) PCT No.: PCT/EP2016/000102
 § 371 (c)(1),
 (2) Date: Aug. 3, 2017

(87) PCT Pub. No.: WO2016/128107
 PCT Pub. Date: Aug. 18, 2016

(65) Prior Publication Data
 US 2018/0021730 A1  Jan. 25, 2018

(30) Foreign Application Priority Data

Feb. 10, 2015 (EP) .................................... 15290028

(51) Int. Cl.
 *B01D 63/10* (2006.01)
 *C02F 9/00* (2006.01)
 (Continued)

(52) U.S. Cl.
 CPC ........... *B01D 63/10* (2013.01); *B01D 15/361* (2013.01); *B01D 63/14* (2013.01); *C02F 1/42* (2013.01);
 (Continued)

(58) Field of Classification Search
 CPC ...................................................... B01D 35/30
 See application file for complete search history.

(56) References Cited

U.S. PATENT DOCUMENTS 3,685,659 A     8/1972  Heskett et al.
3,746,171 A  *  7/1973  Thomsen ............. B01D 35/153
                                                         210/234

(Continued)

FOREIGN PATENT DOCUMENTS

CN         1419467 A     5/2003
CN         1646202 A     7/2005
                      (Continued)

OTHER PUBLICATIONS

International Search Report and Written Opinion dated Mar. 29, 2016 in corresponding PCT application No. PCT/EP2016/000102.

(Continued)

*Primary Examiner* — Benjamin M Kurtz
(74) *Attorney, Agent, or Firm* — Nields, Lemack & Frame, LLC

(57) ABSTRACT

A connecting mechanism (1) for a cartridge-type replaceable module (2) that has at least one fluid port (2a, 2b) at each of opposite sides of the module (2) in a longitudinal direction of the module (2). The connecting mechanism (1) comprises two connector elements (3) spaced apart in the longitudinal direction of the module (2) and each provided with at least one fluid connector (3b) configured to releasably interengage with a complementary fluid port (2a, 2b) of the module (2) at the respective side thereof, wherein at least one of the connector elements (3) is movable to perform a translational movement in the longitudinal direction of the module (2). The connecting mechanism (1) further comprises at least one driver element (4) arranged to engage with the module (2) and with the at least one movable connector element (3) such that a rotational or translational movement (Continued)

Figure 1:
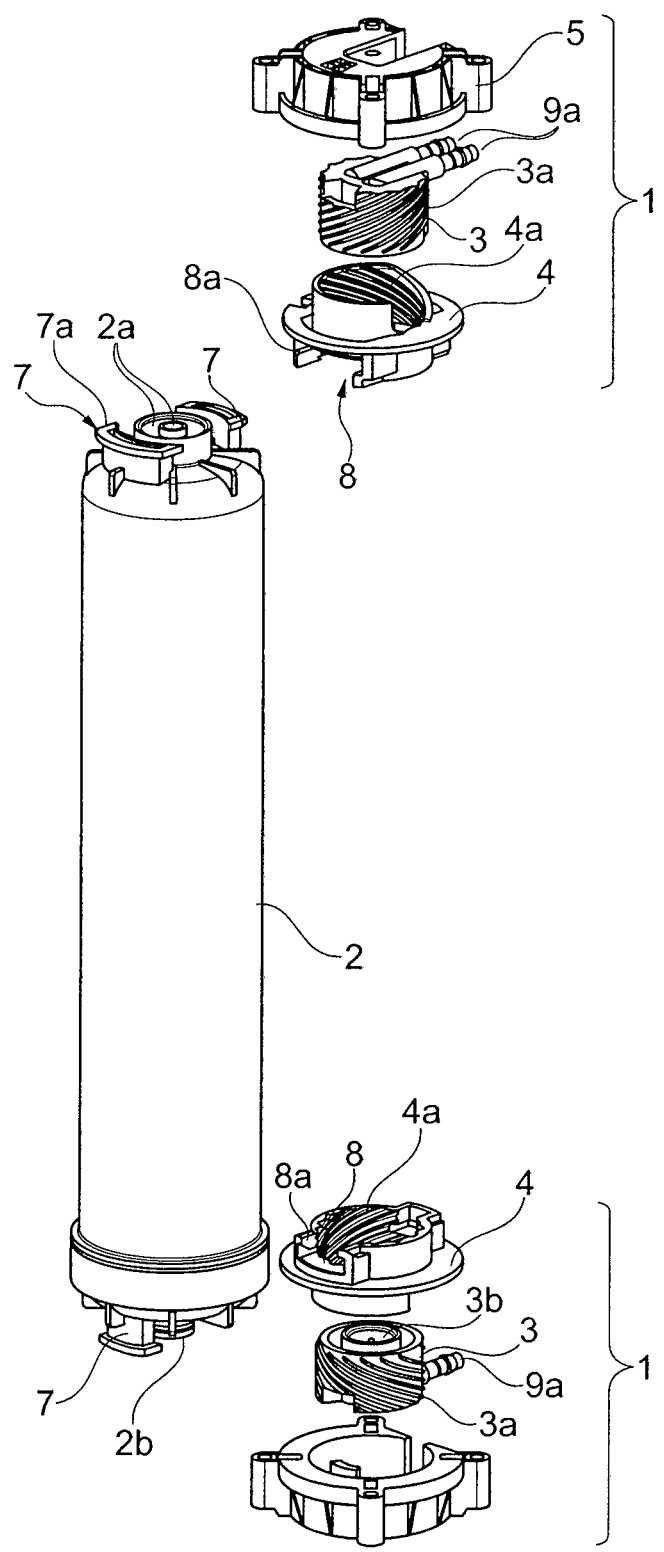

of the module (2) engaged with the driver element (4) causes the translational movement of the movable connector element (3) via the driver element (4) to establish/release the inter-engagement of the fluid connector(s) (3b) of that connector element (3) with the associated fluid port(s) (2a, 2b) of the module (2).

8 Claims, 7 Drawing Sheets

(51) Int. Cl.
| | |
|---|---|
| B01D 15/36 | (2006.01) |
| B01D 63/14 | (2006.01) |
| F16B 35/06 | (2006.01) |
| C02F 1/42 | (2006.01) |
| C02F 1/44 | (2006.01) |
| C02F 103/04 | (2006.01) |

(52) U.S. Cl.
CPC ............... *C02F 1/44* (2013.01); *C02F 9/005* (2013.01); *F16B 35/06* (2013.01); *B01D 2313/13* (2013.01); *B01D 2313/44* (2013.01); *B01D 2315/10* (2013.01); *C02F 2103/04* (2013.01); *C02F 2201/004* (2013.01); *C02F 2201/006* (2013.01)

(56) References Cited

U.S. PATENT DOCUMENTS

| | | | | |
|---|---|---|---|---|
| 4,806,240 | A | * | 2/1989 | Giordano ............... B01D 27/08 206/831 |
| 4,904,282 | A | * | 2/1990 | Stuble ................ B01D 46/0065 55/294 |
| 4,944,875 | A | | 7/1990 | Gaignet |
| 6,383,382 | B1 | | 5/2002 | Johll et al. |
| 2001/0045386 | A1 | | 11/2001 | Stankowski et al. |
| 2003/0217958 | A1 | | 11/2003 | Reid |
| 2008/0164220 | A1 | * | 7/2008 | Hoshino ................ B01D 35/12 210/767 |
| 2010/0044309 | A1 | | 2/2010 | Lee |

FOREIGN PATENT DOCUMENTS

| | | |
|---|---|---|
| CN | 1950137 A | 4/2007 |
| CN | 102123778 A | 7/2011 |
| EP | 0502262 A1 | 9/1992 |
| EP | 1405828 A1 | 4/2004 |
| EP | 1576997 A1 | 9/2005 |
| WO | 2005/042415 A1 | 5/2005 |
| WO | 2010/019526 A1 | 2/2010 |

OTHER PUBLICATIONS

International Preliminary Report on Patentability dated Aug. 15, 2017 in corresponding PCT application No. PCT/EP2016/000102.
Chinese communication, with English translation, dated May 29, 2020 in corresponding Chinese patent application No. 201680009707.6.

* cited by examiner

CONNECTING MECHANISM FOR A WATER PURIFICATION CARTRIDGE

The present invention concerns a connecting mechanism for a cartridge-type replaceable module and a cartridge-type replaceable module, preferably for use in a water purification system, and to a water purification system using the connecting mechanism and adapted to be used with the cartridge-type replaceable module.

Water purification systems for producing ultrapure water are known and are normally made up of peripheral components like a supporting frame, water quality monitoring resources, pump, solenoid valves and conductivity cells and a connecting mechanism for releasably mounting one or two purification cartridges by inter-engaging complementary connectors. Ultrapure water is characterised by a resistivity of greater than 18 MΩ×cm and a total organic compound (TOC) of less than 20 parts per billion. The use of ultrapure water has increased in research and industry. Typical uses are in laboratory environments where the daily use volumes vary from a couple of litres up to 1500 litres. The water purification process consist of several filtration steps where the water is put in contact with purification media or is pushed through different types of membranes. Over time, the purification media get exhausted and/or the membranes get clogged so that these media and membranes need replacement on a timely or water consumption basis. The media and/or membranes are typically packaged in cartridges to facilitate the correct exchange of these consumable media from the respective water purification system.

Early concepts of replaceable cartridges comprise an assembly of four tubes connected by end plates and filled with resin particles designed to provide the desired water treatment. Connectors are provided at the top and bottom end plates for fitting the cartridge to the mating connectors of the water purification system. The connectors project from the end plates in a direction perpendicular to the longitudinal direction of the cartridge. Such a cartridge is described in U.S. Pat. No. 4,944,875B. The mounting of the cartridge to a connecting mechanism involves a simultaneous insertion of the two connectors at the endplate of the module into corresponding mating fluid connectors of the system. This process is difficult as two connectors need to be inserted simultaneously in a direction that is perpendicular to the longitudinal direction of the cartridge. Moreover, providing the fluid-tight connection between the ports on the cartridge and the fluid connectors on the system requires additional control steps and various manual handling. From the purification standpoint, this system is disadvantageous because the bottom up flow through the unit's mixed bed exchange media is not desirable as the mixed bed of anionic and cationic resin beads of the media get separated.

U.S. Pat. No. 6,383,382B1 discloses another cartridge with fluid purification media especially suitable for the production of ultra-pure water. The replaceable unit includes in fact two cartridges moulded together as a single piece with a common wall and smaller conduits or plenums located adjacent the common wall between the two cartridges to provide a fluid communication between the bottom of the first cartridge and the top of the second cartridge. All ports of the unit are located at a top end cap whereas a bottom end cap spaced apart in the longitudinal direction of the unit is completely closed. Accordingly, the top end cap is provided with a fluid inlet port and a permeate outlet port. In operation, fluid to be filtered or otherwise treated with media such as activated carbon or ion exchange media contained in the unit enters the fluid inlet port in the top end cap, flows downward through a porous screen and the media contained in the first cartridge and thorough a lower screen, is collected at the bottom end cap and is directed upward through the first cartridge permeate plenum to the top of the second cartridge. In the second cartridge the fluid permeate flows downward again through a porous screen and through the media of the second cartridge, until the permeate is collected at the bottom of the second cartridge. Finally, it is directed upward through the second cartridge permeate plenum and led out through the permeate outlet port at the top end cap. This system is disadvantageous because the purified water which has been depopulated from its ions, contacts the wall of the permeate plenum and is being contaminated by the extracted contaminants of the cartridge material during its way back to the top of the cartridge. Further, the document does not describe how the inlet and outlet ports at the top end cap are connected to the mating fluid connectors of the system. A further module for purifying water is described in EP1405828A1. This document discloses a module including a monolithic container holding in its interior media for sequentially performing pre-treatment and treatment of the water entering the module. A head at the top side of the module is provided with three parallel connectors extending perpendicular to the longitudinal axis of the container of the module and in each of which there is formed a water inlet or outlet orifice communicating with the interior of the module. The connectors can be either male or female connectors and are inserted into mating fluid connectors of a water purification system. Like in the system described in U.S. Pat. No. 6,383,382B1 the flow of fluid in the module is from top to bottom and reversed back to the top where all the ports of the cartridge are located so that this system has the same disadvantages discussed above. Further, the document does not describe how the parallel connectors at the top end of the head are connected to the mating fluid connectors of the system.

It is the object of the present invention to provide a connecting mechanism for a cartridge-type replaceable module and a cartridge-type replaceable module, preferably for use in a water purification system, and a water purification system providing a facilitated and safe replacement of the replaceable modules and fluid connection with the system and, as far as the water purification system is concerned, avoiding the disadvantages of a reversed fluid flow in the modules.

To solve that problem the present invention provides a connecting mechanism, a cartridge-type replaceable module, and a water purification system. Preferred embodiments of the connecting mechanism, of the cartridge-type replaceable module, and of the water purification system are defined in the depended claims.

Accordingly, the present invention provides a connecting mechanism for a cartridge-type replaceable module that has at least one fluid port at each of opposite sides of the module in a longitudinal direction of the module, the connecting mechanism comprising:

two connector elements spaced apart in the longitudinal direction of the module and each provided with at least one fluid connector configured to releasably inter-engage with a complementary fluid port of the module at the respective side thereof, wherein at least one of the connector elements is movable to perform a translational movement in the longitudinal direction of the module;

at least one driver element arranged to engage with the module and with the at least one movable connector element such that a rotational or translational movement of the module engaged with the driver element causes the translational movement of the movable connector element via the driver element to establish/release the inter-engagement of the fluid connector(s) of that connector element with the associated fluid port(s) of the module.

The connecting mechanism of the invention is specifically designed for a cartridge-type replaceable module that has at least one fluid port at each of opposite sides or ends of the module in a longitudinal direction of the module. The provision of the two connector elements spaced apart in the longitudinal direction of the module provided with the mating fluid connectors provides the possibility of using a type of replaceable module that is designed to rely on an uni-directional flow of fluid through the module from one side (end) to the other side (end), thereby avoiding the problems associated with a reversing of the flow within the same module. Further, the feature that the rotational or translational movement of the module itself engaged with the driver element of one or of both connector elements causes the translational movement of the moveable connector element via the driver element to thereby establish/release the inter-engagement of the fluid connector(s) of that connector element with the associated fluid port(s) of the module. This provides a safe and reliable fluid connection of the module with the connecting mechanism with an intuitive predefined limited movement of the module (rotational or translational movement) so that the user does not have to perform additional control steps or manipulation in order to fluidly connect the module to a system, i.e. a water purification system, and ascertain the correct connection.

Since the fluid connection involves an active movement of the connector element in the connecting mechanism via the module induced by the movement of the module, the fluid ports of the module can be recessed from the outside and accordingly protected from damages.

Further, the translational or rotational movement of the module causing the translational movement of the moveable connector to establish/release the inter-engagement of the fluid connector(s) with the associated fluid port(s) of the module can be effected by a "one hand operation" and attaching and detaching of the module is effected by the same process in forward or reverse, i.e. opposite directions. In addition, the connection can be established without any additional tools or manipulations at the connection between the fluid port(s) and the fluid connectors—the user only manipulates and touches the module.

Lastly, the inter-engagement takes place within the interior of the connecting mechanism and is thus not exposed to the environment so that contamination or other negative influences on the system can be avoided.

Preferably, both connector elements are movable to perform the translational movement in the longitudinal direction of the module, and two driver elements are arranged to engage with the module and with a respective associated one of the two movable connector elements such that the rotational or translational movement of the module causes, via the engagement with the respective driver element, the translational movement of the movable connector elements in opposite directions to establish/release the inter-engagement of the fluid connectors of both connector elements with the fluid ports at the opposite sides of the module.

This modification is especially preferred as it involves the simultaneous translational movement of the two connector elements at the opposite sides of the module in the same direction but opposite to each other so that the reliable fluid connection at both sides can be effected via the active translation of the connector elements induced by the rotational or translational movement of the module via the respective driver elements. Preferably, the engagement between each driver element and the associated movable connector element is a threaded engagement adapted to transmit a rotational movement of the driver element to the translational movement of the connector element.

The threaded engagement between the driver element and the associated moveable connector element is an effective way of translating the rotational movement of the module to a translational or lineal movement of the connector element by a screw/nut mechanism. The selection of a suitable thread-type and inclination determines the distance of the translational movement of the connector element caused by a specific rotational amount of the driver element engaged with the module. A steeper thread causes a larger linear movement than a more shallow thread. The thread can even change to produce a specific kinematic.

Preferably, the threaded engagement between the driver element and the associated movable connector element at the respective sides of the module is in opposite directions such that the rotation of the module engaged with both driver elements in one rotational direction causes the translational movement of the connector elements in the same axial direction of the module but opposite to each other.

Preferably, each driver element is adapted to releasably engage with a portion of the module in a form-locking manner such that a rotational movement of the module about an axis in the longitudinal direction is transmitted to rotate the driver elements and the releasable engagement of the driver element with the portion of the module in the form-locking manner includes means for transmitting the rotational force from the module to the driver element and means for transmitting an axial force resulting from a fluid back pressure from the connector element to the module.

The form-locking engagement between the portion of the module, preferably at both sides in the longitudinal direction, and the driver element provides for a precise transmission of the rotational force or momentum imparted by the user to the module toward the driver elements and further, preferably through the threaded engagement, toward the driver elements to effect the translational movement thereof to establish/release the inter-engagement of the fluid connector(s) with the complementary fluid port(s) of the module. The additional means for transmitting the axial force resulting from a fluid back pressure from the connector element to the module provides the effect that the longitudinally spaced apart connector elements are not pushed apart from each other if fluid-back pressure at the ports acts upon them in operation but the axial forces can be counter-acted and compensated by the module housing itself. Accordingly, no axial forces are transmitted to other parts of a water purification system holding the connecting mechanism. This is especially important where the connecting mechanism and the two connector elements spaced apart in the longitudinal direction are provided in a cantilever fashion that facilitates inserting of the module into the driver elements from a front side without impediment.

Preferably, the connecting mechanism comprises index means for marking a defined rotational position of the driver element corresponding to a position where the movable connector element has established and/or released the inter-engagement of the fluid connector(s) with the fluid port(s) of the module.

The provision of the index means for marking a defined rotational position of the driver element provides the effect that a final locking position can be defined in a manner that the user clearly senses and can confirm the locking positions so that he can be sure that the fluid connection is properly established and/or released (visually and/or aurally and/or by sensing a snap at the defined position).

Preferably, the index means is adapted to releasably block the rotational movement of the driver element at the defined rotational position (Claim 8). This feature prevents any inadvertent releasing of the inter-engagement of the fluid connectors.

Preferably, each fluid connector of the connecting element is arranged to communicate with an associated external port provided on the connecting element and is accordingly moveable together therewith. This arrangement involves a certain movement of connecting tubing or hoses extending from the system to the external port of the connecting element but provides a relatively simple structure with a minimum number of components. Alternatively, each fluid connector of the connecting element is arranged to communicate with an external port provided on a support element of the connecting mechanism that is fixed relative to the connecting element during movement thereof. Such a solution provides a more complicated internal structure and fluid connections between the moveable fluid connector and the support element but avoids the movement of the external port and of any attached connecting tubing or hoses when the module is attached/detached from the connecting mechanism.

The invention also provides a cartridge-type replaceable module comprising a columnar container, at least one fluid port at each of opposite sides of the module in a longitudinal direction of the module, at least a purification medium and/or a membrane received in the container, and a portion formed on at least one of the opposite sides of the module for a releasable form-locking engagement with a part of a connecting mechanism to transmit a rotational movement of the module about an axis in the longitudinal direction to the connecting mechanism.

Preferably, the portion for the releasable form-locking engagement with the part of the connecting mechanism includes means for transmitting an axial force resulting from a fluid back pressure at the fluid port(s) to the module. With this structure the force from a back pressure at the fluid port(s) that acts during operation in the axial direction can be received and compensated by the housing of the module itself.

Preferably, the module has the fluid port at one side serving as inlet and two fluid ports at the opposite side serving as outlets, and a membrane arranged in the container to allow tangential filtration of a feed stream introduced to the inlet and extraction of permeate and retentate from the outlets.

Preferably, the module has the fluid port at the top side serving as inlet and a fluid port at the opposite bottom side serving as outlet, and ion exchange media arranged in the container.

The provision of the cartridge-type replaceable module having the fluid port at one side serving as the inlet and of two (or more) fluid ports at the opposite side serving as outlets allows the application of a tangential filtration operation on the water while retaining the uni-directional flow from one side (i.e. the top) to the opposite side (i.e. the bottom) of the module in the longitudinal direction thereof.

The invention also provides a water purification system comprising an inlet for water to be purified and an outlet for purified water, a frame supporting at least one connecting mechanism according to the invention for a cartridge-type replaceable module according to the invention, wherein the connecting mechanism is adapted to engage with the module and connect to the fluid ports of the module upon a rotational or translational movement of the module to establish a fluid communication from the inlet through the module to the outlet.

This water purification system of the invention is easy to operate especially with respect to the exchange of the cartridge-type replaceable module(s) containing the purification media for the water purification and allows the use of such module(s) employing a uni-directional flow from an inlet at one side of the module to one or more outlets at the other side of the module, thereby avoiding the reversing of the flow within the module. At the same time, the use of the connecting mechanism according to the invention provides for a facilitated, preferably simultaneous establishing of the fluid connection at both opposite ends of the module by only the simple intuitive rotational or translational movement of each module relative to the associated connecting mechanism.

Preferably, the frame supports at least two connecting mechanisms according to the invention, each adapted to engage with one module according to the invention to connect to the fluid ports of the modules, and the connector elements of the connecting mechanisms are arranged to communicate with each other and with the inlet and outlet and with the fluid ports of the modules such that a serial flow of the fluid through the modules can be created in operation between the inlet and the outlet when the modules are connected in the connecting mechanisms.

This water purification system is designed to utilize at least two modules (i.e. holding different pre-treatment media and polisher media necessary to achieve the desired level of water purification) such that water to be purified flows through the plural modules in a defined serial flow from an inlet of the system to an outlet of the system where the purified water can be retrieved. Although plural modules are removably received in the system each of them can be mounted/dismounted in the same simple manner by the translational or rotational movement and can be exchanged independently from other modules or the system. Further, the use of separate modules allows that the flow direction through each module can be from top to bottom in that a connecting fluid pathway is provided in the system that provides a fluid communication between the outlet at the bottom of one module and the inlet at the top of the next module in series.

Figure 2A:
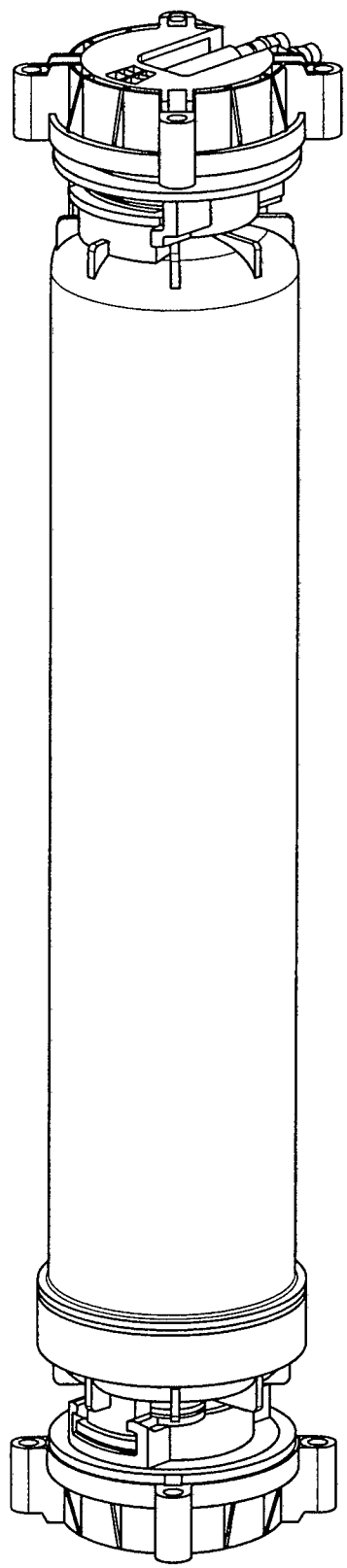
Figure 2B:
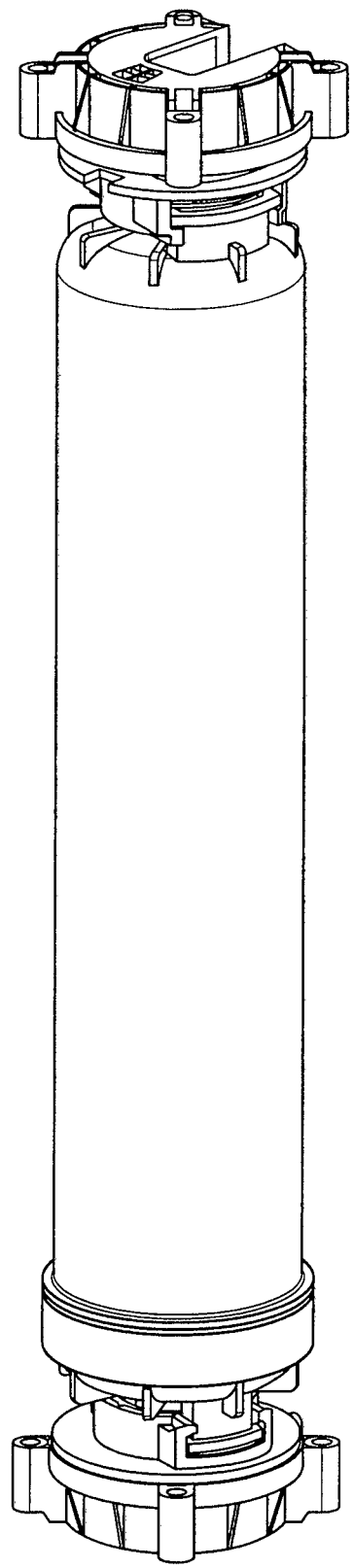
Figure 3B:
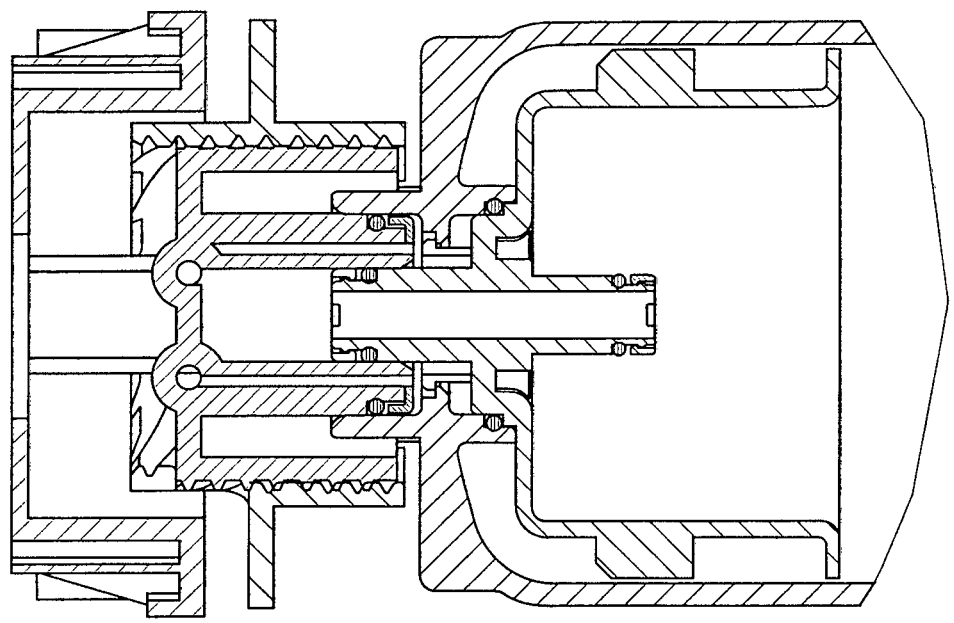
Figure 3A:
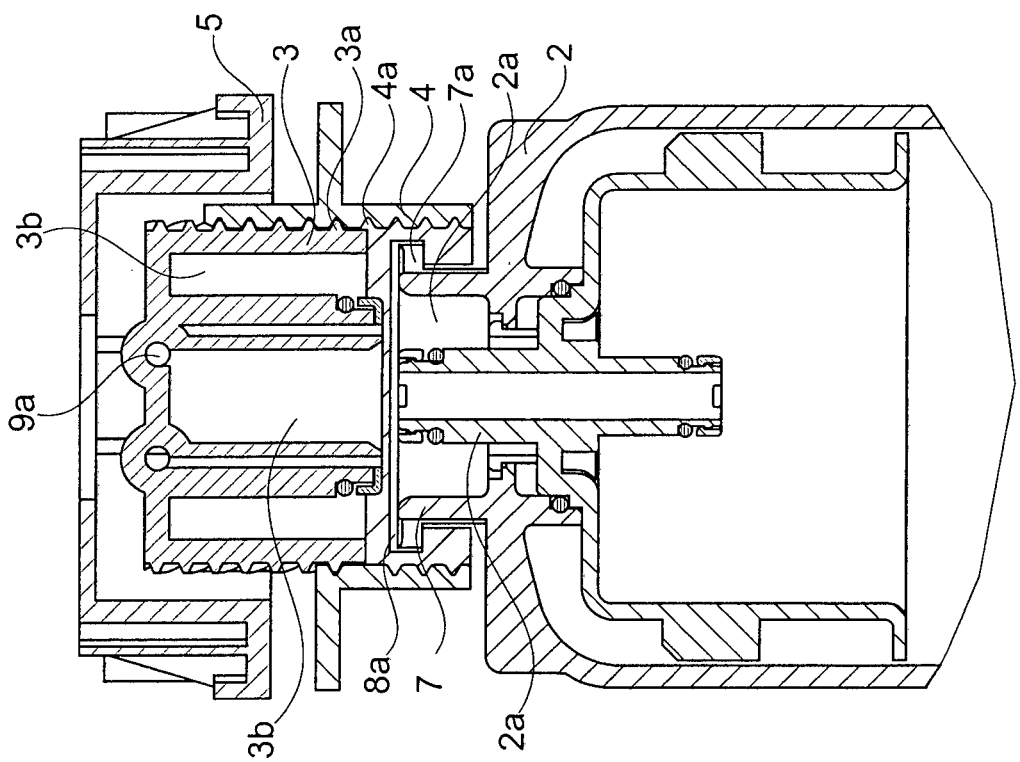
Figure 4:
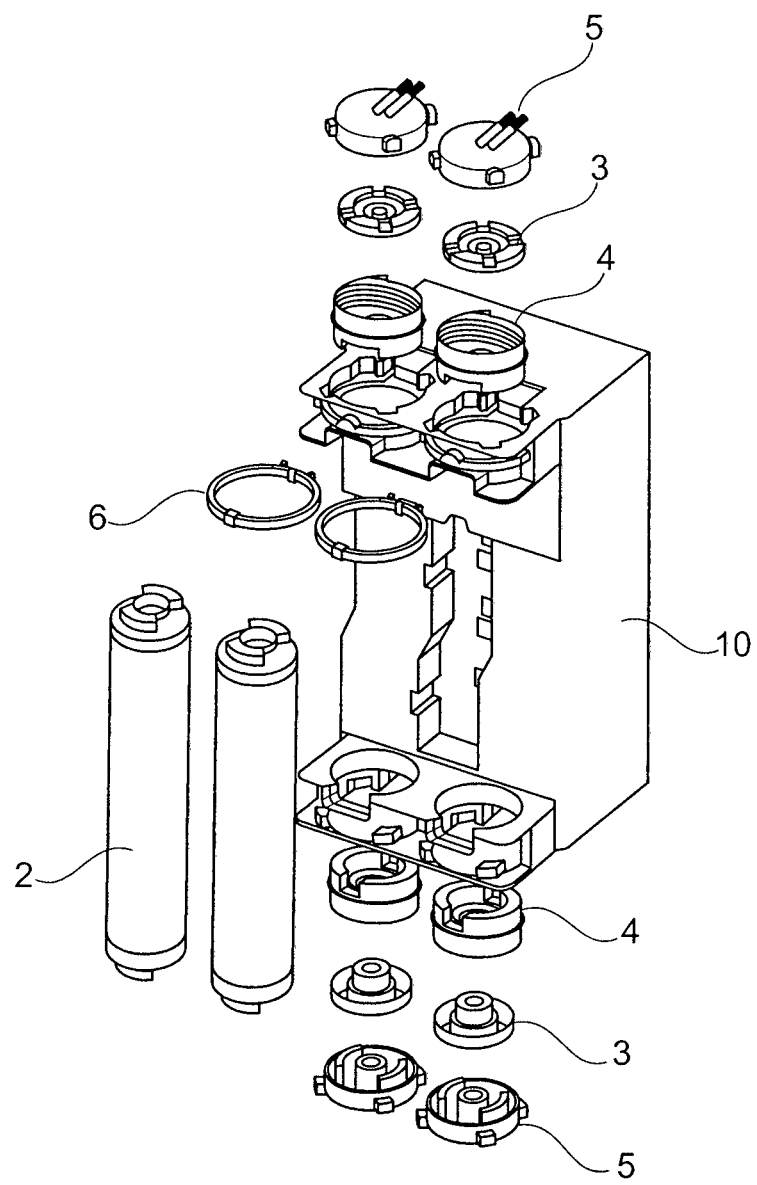
Figure 5A:
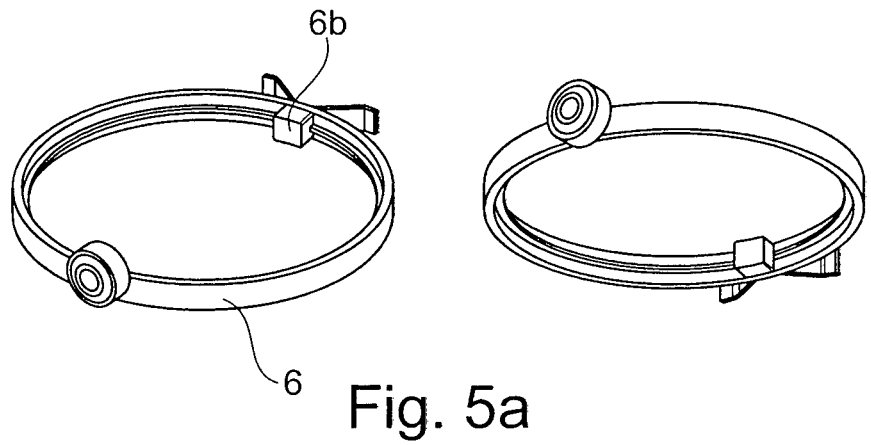
Figure 5B:
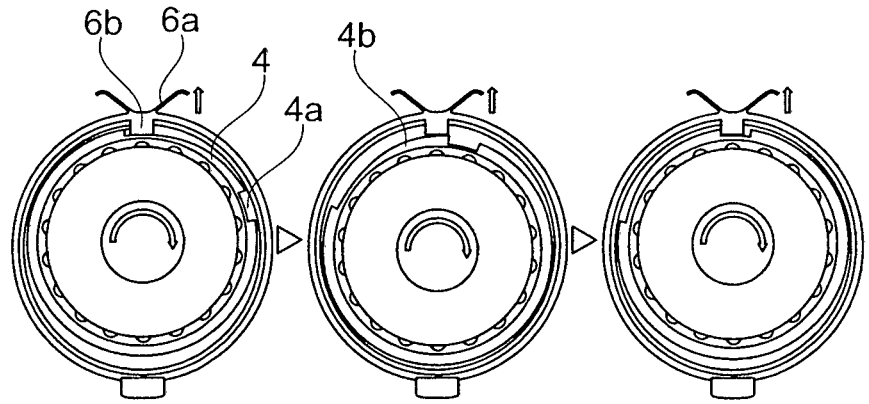
Figure 6:
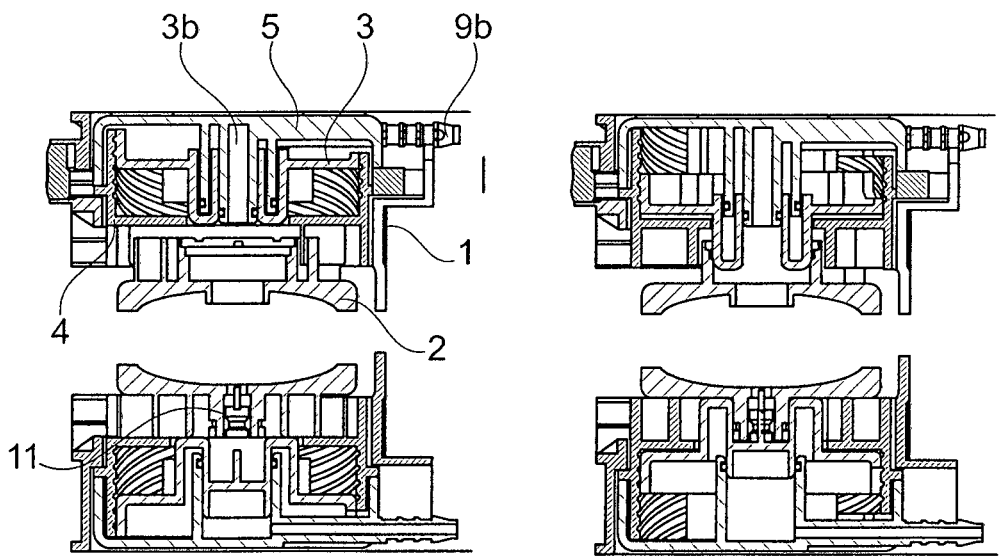
Figure 7:
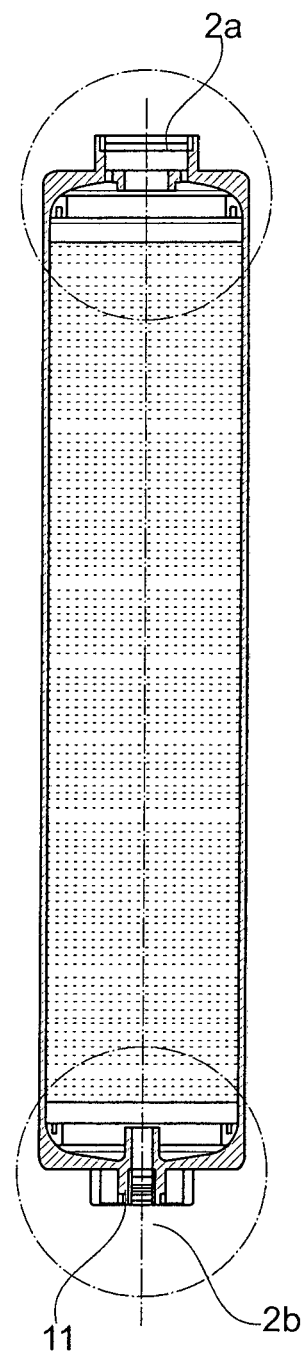
Figure 8:
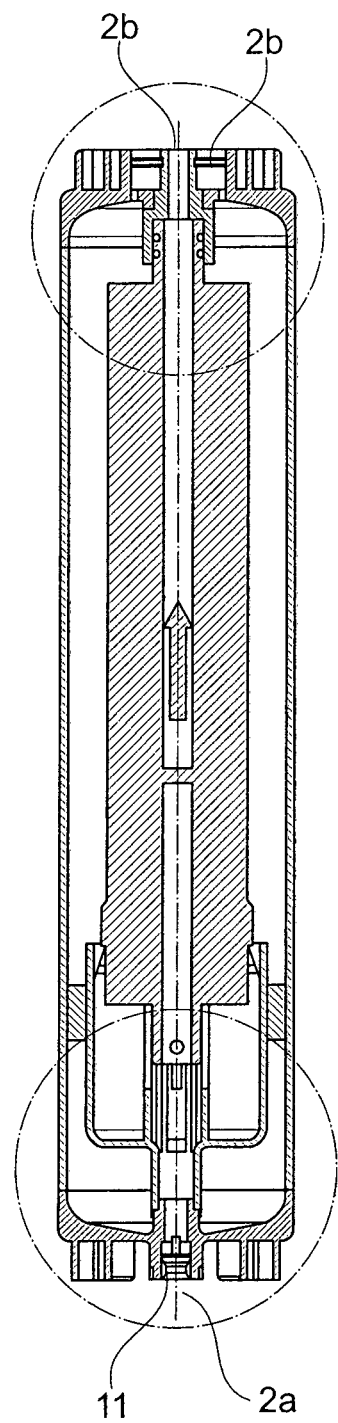

The present invention will now be described by way of examples and reference to the attached drawing. In this drawing:

FIG. 1 is a perspective exploded view of a connecting mechanism and of a cartridge-type replaceable module according to a first preferred embodiment of the invention;

FIGS. 2*a* and 2*b* show the connecting mechanism and module of FIG. 1 in open and locked position, respectively;

FIGS. 3*a* and 3*b* show a magnified detail of the top part of the connecting mechanism of FIG. 1 in a sectional view and in open and locked position, respectively;

FIG. 4 shows a perspective exploded view of a water purification system including two connecting mechanisms for receiving two replaceable modules according to a second embodiment of the invention;

FIGS. 5*a* and 5*b* show an index means of the connecting mechanism in the water purification system of FIG. 4 in perspective view and in a top view in various positions during the rotational movement of the driver element;

FIG. 6 shows the connecting mechanism according to a further preferred embodiment in an open and closed position wherein the majority of the module is omitted and only the relevant parts of the connecting mechanism at the respective opposite sides are shown in a cross-sectional view;

FIG. 7 shows an example of an embodiment of a cartridge-type replaceable module according to the invention for use in combination with a connecting mechanism of the invention and containing ion exchange media and a single fluid port at each of opposite sides of the module; and FIG. 8 shows another example of a cartridge-type replaceable module according to the invention for use in combination with a connecting mechanism of the invention and related to a cross flow filter having a single fluid port at one side and two fluid ports at the opposite side of the module.

Starting with the detailed description of examples of cartridge-type replaceable modules according to the invention we refer to the FIGS. 7 and 8 which show two different cartridge-type replaceable modules for use in a water purification system, wherein FIG. 7 relates to a module containing ion exchange media and FIG. 8 relates to a module including a across flow filter or filtration membrane. The membrane can be in this case either a pleated or spiral membrane with one or plural layers and/or sheets. The water stream through the module is, in the case of FIG. 7, from the top side end of the cartridge to the bottom side end thereof. Consequently, the top side of the module has a single fluid port 2a serving as an inlet for the water to be purified and the bottom side contains a single fluid port 2b serving as the outlet for the (partially) purified water.

In the module of FIG. 8 the preferred flow direction is from bottom to top so that the bottom side end of the module is provided with a single fluid port 2a serving as an inlet for the feed stream, and the top side end of the module is provided with two outlets 2b serving to extract permeate and retentate.

The modules preferably and as shown have a columnar container with sealed and caps at both axial ends. The end caps including the fluid ports can be in principal identical wherein fluid ports not necessary for a particular flow configuration can be simply closed off. A columnar container that is open at both ends can be easily filed in the production process and potentially easily recycled after use once the end caps are removed. For this purpose the end caps can be integrally sealed or releasably attached to the columnar container. The columnar container facilitates and supports the intuitive gripping by hand and rotating of the module for establishing the fluid connection with the connection mechanism as described below. The outside of the container periphery can be provided with additional features that support the intuitive handling and operation, i.e. printed or molded markings.

The module configuration with the fluid ports at both axial ends is preferable as the foot print of the modules during storage and handling is small. Furthermore, as described below, the fluid ports can be recessed from an outer contour because the fluid connection is established via the active movement of the connector elements into and out from the fluid ports. Accordingly, the fluid ports are protected from damage during handling and storage. The design of the module with an inlet at one axial end and the outlet at the opposite axial end is advantageous for the ion exchange application as the fluid flow from top to bottom prevents fluidisation of the mixed bed which is a disadvantage in a number of prior configurations where the flow direction is reversed within the same module and is from bottom to top in the ion exchange media section of the module.

The modules are provided with portions 7 (see FIGS. 1 and 2a/b) providing for a form-locking engagement of the respective side ends of the module with the driver elements of the connecting mechanism described below. These are not visible in the cross sectional views of FIGS. 7 and 8. Of course, similar portions as shown in more detail in the module of FIG. 1 are used at both axial end sides. The fluid ports 2b at the top end side of the module in FIG. 8 are concentric about a central longitudinal axis so that the fluid connection of both ports with the connector element of the connecting mechanism being provided with complementary concentric fluid ports during the translational movement of the connector element can be established despite of the rotational movement of the module causing the translational linear movement of the connector element. The opening of the fluid ports consequently has to be uninterrupted at least for a sector width corresponding to the amount of rotational movement of the module required for establishing the inter-engagement between the fluid ports and the complementary fluid connectors. The plural fluid ports and connectors can be concentric and located at different radial positions or at different sectorial positions. More than two such ports can be provided at each end of the module as needed to establish the intended fluid flow into or out from the module.

The material and arrangement of the ion exchange media and of the cross flow filter in the modules of FIG. 7 or 8 can be selected as is known in the prior art for the purpose of producing purified water. The modules of FIGS. 7 and 8 can be combined together in the water purification system shown in FIG. 4 wherein the fluid communications in the system are designed such that, after mounting the modules to the system, the proper flow of the water to be purified is established from an inlet to the system, serially through the two modules according to the preferred direction either from top to bottom in the ion-exchange module of FIG. 7 and from bottom to top in the cross flow filter module of FIG. 8, and then out to the outlet of the system.

A check valve 11 may be provided on the bottom of each module to prevent water remaining inside the module to leak when the module is removed from the system during module exchange.

The modules may accordingly have at least one fluid port at each of opposite sides or side ends of the module 2 in the longitudinal direction of the module, and even more than two fluid ports at one end are possible if needed. The modules may also all have the same design at the end caps with the same number of ports but with certain ports on a side blocked where not needed. This reduces the number of variants for the end caps of the modules.

The connecting mechanism of the invention for each module according to a first embodiment shown in FIGS. 1 to 3 has two connector elements 3 spaced apart in the longitudinal direction of the module 2 which are provided with fluid connectors 3b complementary to the fluid ports of the module with which they are to cooperate. Accordingly, the connector elements 3 are provided with one or more (i.e. at least one) fluid connector(s) 3b configured to releasably inter-engage with the complementary fluid port(s) 2a,2b on the module 2 at the respective side thereof. The connector elements 3 are moveable to perform a translational, preferably linear movement in the longitudinal direction of the module 2, preferably along the vertical axis when the connecting mechanism is integrated in a water purification system designed to take up the cylindrical modules in an upright posture. In other words, the connector element 3 can translate in the axial direction but is prevented from rotating, for example by a support element 5 of the connecting mechanism that is intended to remain stationary.

Each connector element 3 is provided with the at least one fluid connector 3b which is further arranged to communicate with an associated external port 9a provided on the connector element 3. Due to the integration of the external port 9a into the connector element 3 it will move together with the connector element when the same performs is translational movement.

As shown in FIG. 1 the connector element 3 at the top side of the module 2 is provided with two fluid connectors 3b to releasably inter-engage with two complementary fluid ports 2a on the top side end of the module. Each of the fluid connectors 3b is accordingly arranged to communicate with a separate one associated external port 9a. The connector element 3 at the bottom side end of the module has only a single fluid connector 3b arranged to communicate with a single associated integrated external port 9a.

On a portion of the outer circumference of the connector element 3 there is provided an external thread 3a which is designed to threadedly engage and cooperate with an internal thread 4a on a driver element 4 that is rotatably supported in the connecting mechanism. While the driver element 4 is rotatably supported it is prevented from translating in the axial direction, for example by structures of the fixed support element 5. Accordingly, the driver element 4 acts as a nut of a screw/nut drive-mechanism and the connector element 3 acts as the screw. Rotation of the driver element 4 will, due to the restraining of its axial movement, cause a translational movement of the moveable connector element 3 due to the threaded engagement and the fact that the connector element 3 is, in return, prevented from rotating together with the driver element 4. Of course, the type of thread—external or internal—on the driver element 4 and the connector element 3 can be reversed.

The driver element 4 is provided with a receptacle 8 formed to engage with the portion 7 of the module 2 at the respective side end in a form-locking manner such that, when the portion 7 of the module is received in the receptacle 8, a rotational movement of the module 2 about an axis in the longitudinal direction is transmitted to rotate the driver element 4. The insertion direction of the portion 7 of the module 2 into the receptacle 8 of the driver element 4 is preferably essentially perpendicular to the longitudinal axis of the module. The portion 7 of the module providing for the form-locking engagement and the transmission of the rotational movement can be provided with one or more radial protrusions 7a that engage(s) with one or more corresponding groove(s) or recess(es) 8a, preferably symmetrically on both sides of the receptacle 8. The radial protrusion(s) 7a serve(s) as a means for transmitting an axial force resulting from a fluid back pressure transmitted from the fluid in the module to the connector element 3 back to module 2 via the driver element 4. The receptacle 8 of the driver element 4 is preferably provided with a stopper to ascertain that the portion 5 on the cartridge is properly inserted into the receptacle 8 to a position where the fluid connector(s) 3b of the connector element 3 is/are perfectly aligned with the fluid port(s) 2a,2b of the module. The structure of the connector element and driver element on the bottom side of the connecting mechanism is essentially the same as described before for the one at the top side except for the difference that the direction of the threads 3a and 4a of the connector element 3 and of the driver element 4 is in the opposite direction or inclination such that the rotation in one rotational direction of the module 2 engaged with both driver elements 4 causes the translational movement of the connector elements 3 via their engagement with the respective driver element in the same axial direction of the module but opposite to each other, thereby simultaneously establishing or releasing the inter-engagement of the fluid connector(s) of the connector elements with the complementary fluid port(s) at the opposite side ends of the module 2.

A useful rotating range for the module to effect the translational linear movement of the connector elements is for example 60 to 80 degrees so that the connection process can be effected by one hand in a single step. The rotational range required to effect the complete inter-engagement of the fluid connectors and of the fluid ports depends on the necessary axial travel of the fluid connectors on the connector elements (until they establish the fluid tight connection with the ports of the module), which in return is determined by the inclination of the threaded engagement between the connector element and the driver element.

The fluid connectors and/or fluid ports are provided with a suitable sealing means in the form of one or more O-ring(s) or other gasket(s) to avoid leakage of water to the outside (see for example the O-ring seals shown in FIGS. 3a/b).

The embodiment of the connecting mechanism of the invention shown in FIG. 6 differs from the embodiment shown in FIGS. 1 to 3 essentially in that the external port 9b communicating with the respective fluid connector 3b of the connecting element 3 is not integrally formed with the connector element 3 as is the case in the embodiment of FIGS. 1 to 3, with the consequence that it translates together with the connector element, but is formed on the support element 5 that is fixed relative to the connecting element 3 during the translational movement of the connecting element. This is achieved in that there is an internal fluid connection between the external port 9b and the fluid connector 3b that accommodates the linear movement of the connecting element 3 relative to the support element 5 while maintaining the fluid connection. In the embodiment this is realized by a labyrinth type of seal allowing axial movement of the connecting element 3 relative to the support element while the flow path remains sealed to the environment. A corresponding structure can be provided if two or more fluid connectors 3b are to be fluidly connected to a corresponding number of external ports 9b on the fixed support element 5.

The other aspects of the second embodiment are essentially the same as in the first embodiment wherein the single fluid connector 3b of the connecting element 3 at the bottom side is provided with a check valve 11 that automatically closes to prevent water inside the module to leak when the module is removed from the connecting mechanism.

The water purification system shown in FIG. 4 employs two connecting mechanisms 1 of the invention mounted in a frame-like housing 10 such that two cartridge-type replaceable modules 2 can be releasably mounted in the system. As described above the modules can be of the same type or can be of different types as the embodiments shown in FIGS. 7 and 8 as long as the interfaces including the portion 5 for transmitting the rotation force and the fluid ports match the receptacle and the fluid connectors. Each of the connecting mechanisms of the system is provided with an index means 6 for marking a defined rotational position of one of the driver elements 4 of each mechanism corresponding to a position there the moveable connector element 3 has established and/or released the inter-engagement of the fluid connector(s) 3b with the fluid port(s) 2a,2b of the module 2.

The index means 6 is adapted to releasably block the rotational movement of the driver element 4 at the defined rotational position. For this purpose the index means 6 can, for example, comprise an elastic or partially elastic ring 6 fixedly attached to frame-like housing 10 and provided with a radial, inwardly projecting element 6b provided so as to slide about the outer periphery of the driver element 4 when the same is rotated through the module. The outer periphery of the driver element 4 can be provided with a cam-like contour 4b for guiding the projecting element 6b and lifting it until it snaps into a notch or recess 4a, whereby the defined rotational position is marked and further rotation of the driver element 4 is prevented. This position is shown in the right representation of FIG. 5b. In order to release the projecting element 6b from the recess 4a spring blade 6a on the outside of the elastic ring 6 is pressed or lifted to allow the ring to be deformed and the projecting element 6b to be raised and removed from the recess 4a, thereby allowing further rotation of the driver element 4.

The index means is only described as an example in the form of the elastic ring and can be embodied in different forms. For example, the ring can be rigid or substantially rigid and only the projecting element 6b can be elastically deformable or rigid itself but radially biased by a separate elastic element, i.e. the form of a locking ball biased by a spring. Other solutions are possible as long as they provide the function of marking a defined rotational position of the driver element 4 and/or releasably blocking the rotational movement of the driver element at that defined rotational position. The index means can also be provided with two or more defined rotational positions where the rotational movement is interrupted or blocked.

The index means 6 is shown in connection with the embodiment of FIG. 4 but can be likewise provided in the embodiment of FIGS. 1 to 3.

The replacement of consumables in a water purification system is simple and can be affected by a one-hand operation. It is also intuitive as the movement to be made by the user is a simple rotation of the module after the same is inserted into the connecting mechanism.

The provision of the index means improves additional security as the user is given a noticeable indication, i.e. tangible, audible and/or visible of the locking of the module in the rotational position where the complete inter-engagement of the fluid connectors of the connector element and of the fluid ports of the module is established.

While the embodiments described above use moveable connector elements at both axial ends in the connecting mechanism, the most general application of the invention is a case where only one of the connector elements is moveable and the other one, preferably the one at the bottom, is stationary. In this case the module is inserted from above into the fluid connector(s) of the (stationary) connector element at the bottom side and is then engaged with the driver element of the top side. The fluid engagement between the fluid connector (s) of the connector element at the bottom and the associated fluid port(s) is to be designed such that rotation is possible without compromising the fluid connection. The structure of the connector element and driver element at the top side is as described above in connection with the preferred embodiments of the invention.

While all embodiments are based on the driving of the driver element by a rotation of the module and the transmission of that rotation to a translational linear movement of the connector elements through a nut/screw mechanism, it is also feasible that the driving causing the inter-engagement of the fluid connectors with the associated fluid ports is induced by a translational movement of the module and transmitted to the connector element(s) via a lever-mechanism or other suitable mechanical linkage.

The invention claimed is:

1. A connecting mechanism and cartridge-type replaceable module that has at least one fluid port at each of opposite sides of the module in a longitudinal direction of the module, comprising:
a module;
two connector elements, that when attached to the module in operation, are spaced apart in the longitudinal direction of the module, each provided with at least one fluid connector configured to releasably inter-engage with a complementary fluid port of the module at the respective side thereof, wherein at least one of the connector elements is movable to perform a translational movement in the longitudinal direction of the module; and
at least one driver element provided with a receptacle formed to releasably engage with a portion of the module in a form-locking manner and with the at least one movable connector element such that a rotational movement of the module, when engaged with the at least one driver element in operation, about an axis of the module in the longitudinal direction thereof causes the translational movement of the at least one movable connector element via the at least one driver element to establish/release the inter-engagement of the at least one fluid connector(s) of said at least one moveable connector element with an associated one of the at least one fluid ports of the module,
wherein the at least one driver element and the at least one movable connector element each have a plurality of threads, and wherein the engagement between the at least one driver element and the at least one movable connector element is a threaded engagement adapted to transmit the rotational movement of the at least one driver element to the translational movement of the at least one moveable connector element, and wherein each degree of rotation of said at least one driver element results in axial translation of said at least one movable connector element.

2. The connecting mechanism and cartridge-type replacement module according to claim 1,
wherein both connector elements are movable to perform the translational movement in the longitudinal direction of the module, and wherein said at least one driver element comprises a first driver element arranged to engage with the module and with a respective associated first moveable connector element of said at least one movable connector elements, and a second driver element arranged to engage with the module and with a respective associated second moveable connector element of said at least one moveable connector elements, such that the rotational movement of the module, when engaged with the driver element in operation, causes, via the engagement with the respective driver element, the translational movement of said first and second movable connector elements in opposite directions to establish/release the inter-engagement of respective fluid connectors of said at least one fluid connector of said first and second connector elements with respective fluid ports of said at least one fluid port at the opposite sides of the module.

3. The connecting mechanism and cartridge-type replacement module according to claim 1, wherein the at least one connector element is arranged to be movable in the axial direction and to be prevented from rotating.

4. The connecting mechanism and cartridge-type replacement module according to claim 2, wherein a threaded engagement between the first driver element and the associated first movable connector element and between the second driver element and the associated second movable connector element at the respective sides of the module is present and is in opposite directions such that the rotation of the module engaged with the first and second driver elements in one rotational direction causes the translational movement of the first and second connector elements in opposite axial directions of the module.

5. The connecting mechanism and cartridge-type replacement module according to claim 1, wherein the releasable engagement of the receptacle of the at least one driver element with the portion of the module in the form-locking manner includes means for transmitting an axial force resulting from a fluid back pressure from the at least one moveable connector element to the module.

6. The connecting mechanism and cartridge-type replacement module according to claim 1, wherein the connecting mechanism comprises an indexer marking a defined rotational position of the at least one driver element corresponding to a position where the at least one movable connector element has established and/or released the inter-engagement of the at least one fluid connector(s) with the at least one fluid port(s) of the module.

7. The connecting mechanism and cartridge-type replacement module according to claim 6, wherein the indexer is adapted to releasably block the rotational movement of the at least one driver element at a defined rotational position.

8. The connecting mechanism and cartridge-type replacement module according to claim 1, wherein the at least one fluid connector of the at least one moveable connector element is arranged to communicate with an associated external port provided on the at least one moveable connector element and is movable therewith, or communicates with an external port provided on a support element that is fixed relative to the at least one moveable connector element during movement thereof.

\* \* \* \* \*